United States Patent
Pluciennik

(10) Patent No.: US 10,899,204 B2
(45) Date of Patent: Jan. 26, 2021

(54) BEARING AND DRIVE DEVICE FOR AN ADJUSTABLE COVER OF A VEHICLE ROOF

(71) Applicant: Webasto SE, Stockdorf (DE)

(72) Inventor: Björn Pluciennik, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 0 days.

(21) Appl. No.: 16/478,373

(22) PCT Filed: Jan. 29, 2018

(86) PCT No.: PCT/EP2018/052143
§ 371 (c)(1),
(2) Date: Jul. 16, 2019

(87) PCT Pub. No.: WO2018/141691
PCT Pub. Date: Aug. 9, 2018

(65) Prior Publication Data
US 2019/0366818 A1    Dec. 5, 2019

(30) Foreign Application Priority Data
Feb. 1, 2017   (DE) .................... 10 2017 102 002

(51) Int. Cl.
*B60J 7/057*    (2006.01)
*B60J 7/043*    (2006.01)

(52) U.S. Cl.
CPC ............... *B60J 7/057* (2013.01); *B60J 7/043* (2013.01); *B60J 7/0573* (2013.01)

(58) Field of Classification Search
CPC ... B60J 7/02; B60J 7/024; B60J 7/0435; B60J 7/057; B60J 7/0573

USPC ............................................ 296/216.08, 223
See application file for complete search history.

(56) References Cited

U.S. PATENT DOCUMENTS

| | | | |
|---|---|---|---|
| 5,104,178 A | 4/1992 | Bienert | |
| 9,764,626 B2 | 9/2017 | Park et al. | |
| 2008/0054684 A1 | 3/2008 | Tsukamoto et al. | |
| 2016/0107513 A1 | 4/2016 | Skorianz et al. | |

FOREIGN PATENT DOCUMENTS

| | | |
|---|---|---|
| CN | 105 246 720 A | 1/2016 |
| CN | 106 166 937 A | 11/2016 |
| DE | 40 14 487 C1 | 8/1991 |
| DE | 10048981 A1 | 4/2002 |
| DE | 102 27 028 A1 | 1/2004 |
| DE | 102008046332 A1 | 6/2010 |

(Continued)

OTHER PUBLICATIONS

International Search Report for PCT/EP2018/052143 dated Jun. 7, 2018 (7 pages).

(Continued)

*Primary Examiner* — Dennis H Pedder
(74) *Attorney, Agent, or Firm* — Fitch, Even, Tabin & Flannery, LLP

(57) ABSTRACT

A bearing and drive device for an adjustable cover of a vehicle roof, which may have a guide rail on which the cover is movably mounted by a bearing unit that can be actuated by means of a drive cable, having a cable guide unit that can be coupled to the guide rail at the front or back end thereof, and that has at least one intermediate cable guide for the drive cable and—a guide track for the bearing unit.

16 Claims, 10 Drawing Sheets

(56) References Cited

FOREIGN PATENT DOCUMENTS

| | | |
|---|---|---|
| DE | 10 2012 023 098 A1 | 5/2014 |
| DE | 102014016949 A1 | 5/2016 |
| EP | 2425997 A1 | 3/2012 |
| JP | H10-297283 | 11/1998 |
| JP | 2016-179728 A | 10/2016 |
| WO | 2014/135527 A2 | 9/2014 |

OTHER PUBLICATIONS

German translation of Chinese Office Action for corresponding Chinese Patent Application No. 201880009659.X, English machine translation submitted herewith (2 pages).
International Preliminary Report on Patentability issued against corresponding International Application No. PCT/EP2018/052143 dated Aug. 6, 2019.

BEARING AND DRIVE DEVICE FOR AN ADJUSTABLE COVER OF A VEHICLE ROOF

CROSS-REFERENCE TO RELATED APPLICATIONS

This application is a U.S. national phase application filed under 35 U.S.C. § 371 of International Application No. PCT/EP2018/052143, filed Jan. 29, 2018, designating the United States, which claims priority from German Patent Application No. 10 2017 102 002.0, filed Feb. 1, 2017, which are hereby incorporated herein by reference in their entirety for all purposes.

FIELD

The invention relates to a bearing and drive device for an adjustable cover of a vehicle roof, comprising a guide rail on which the cover is movably mounted by a bearing unit that can be actuated by means of a drive cable.

BACKGROUND

A bearing and drive device for an adjustable cover of a vehicle sunroof is known from DE 102 27 028 A1. A frame device has frame side parts with guide rails arranged thereon, on which sliding elements are mounted for the adjustable mounting of the cover so as to move. A frame front part, which connects the two frame side parts directly with one another, particularly has motor drive apparatuses for the cover as well as for a shade apparatus adjustably arranged under the cover. Guide tubes for drive cables, which are arranged on the frame front part, are inserted at their ends into guide channels on the frame side parts at the transition to the frame side parts and affixed some distance from one another and on the frame device by means of pipe clamps. The drive cables which are guided in the guide tubes from the drive apparatuses of the cover and the shade apparatus are reliably guided into the guide channels by means of the fixation pipe clamps. The guide tubes are encapsulated at least over a section of their length with damping tubes, whereby a reduction in unpleasant noises can be achieved during actuation of the drive apparatus and essentially during driving operation as well.

SUMMARY

The object of the invention is to obtain a bearing and drive device as mentioned previously, which is improved with respect to a compact design, particularly of a cable guide, as well as to provide a sunroof frame assembly according to the preamble of claim 16 having such improvement.

This object is achieved with the previously mentioned bearing and drive device according to the invention in that a cable guide unit is provided, which can be coupled to the guide rail at the end and has at least one cable guide for the drive cables and a guide link for the bearing unit.

The object is also achieved by means of a sunroof frame assembly having the features of claim 16.

Advantageous embodiments of the invention are indicated in the dependent claims.

With the bearing and drive device according to the invention, the cable guide unit, as a bridging component, enables an optimized adaptation between a cable feed for the drive apparatus and the cable guide on the guide rail. Because the cable guide unit also has a guide link for the bearing unit, which particularly forms a front section of a guide track arranged on the guide rail, the guide rail can be formed in an economical manner as a continuously longitudinal extruded profile, and a shape of the guide track deviating from the longitudinal course can be provided by the cable guide unit. Consequently, a front section of the guide track may be formed as a control or lifting link with a rising link profile. The cable guide unit can be formed in the shape adapted thereto for different applications.

The cable guide unit can be formed as an independent component with a very compact arrangement of the cable guide for the drive cable and the guide link for the bearing unit. This integration into only one component reduces the expense for parts and assembly with an otherwise multi-part design, in which several parts have to be connected or bolted together so that additional cut or transition points required in such a multi-part design can also be dispensed with. The integration into only one component is thus preferably effected by a one-piece design as a plastic injection-molded part.

Any particularly flat roof element, which is mounted so as to be adjustable by means of such a bearing and drive device, is considered to be an adjustable cover. Such a roof element is, for example, a transparent glass cover or plastic cover, to which the frame and bearing parts are attached or can be molded.

Expediently, the guide link of the cable guide unit accordingly forms an end section of an assigned guide track of the guide rail, which supports the bearing unit so as to move.

The cable guide unit can form a transition component between at least one drive-side cable guide and the guide rail such that a laterally extending frame front part of a sunroof frame assembly, which supports a drive apparatus and drive-side cable guides, is connected to frame side parts of the sunroof frame assembly exclusively via this cable guide unit. On the other hand, such a cable guide unit can also be used in a closed frame assembly.

An especially compact design results when the at least one intermediate cable guide of the cable guide unit and the guide link have a common wall. This can prevent a distance or intermediate space which would otherwise result. The intermediate cable guide is particularly a plastic injection-molded part, with which the intermediate cable guide and the guide link can be produced as integrated components.

In a preferred design, the cable guide unit comprises two intermediate cable guides, which are formed integrated with one another and particularly have a common wall. The one intermediate cable guide accommodates, for example, a drive cable for adjusting the cover, while the other intermediate cable guide accommodates a drive cable for adjusting a shade apparatus such as, for example, a sunblind and guides in a sliding manner.

Furthermore, the two intermediate cable guides may extend over one another in sections and may particularly be arranged so as to intersect. With this design as well, the two intermediate cable guides may extend directly next to one another and have common guide walls, whereby a highly integrated compact arranged can likewise be achieved.

The intermediate cable guides are preferably formed such that they guide and/or surround the respective drive cable along its longitudinal extension alternating on opposite sides, particularly on an upper side and a lower side with respect to the cable guide unit. This prevents sections or channels enclosed around the periphery, whereby production of the intermediate cable guides on the cable guide unit formed as a plastic injection-molded part is simplified.

For a compact arrangement, it may further be provided that the one intermediate cable guide is arranged on a back side facing the guide rail or the rear section of the cable guide unit underneath the guide link.

When the cable guide unit has a coupling mechanism with at least one coupling element for precise coupling to the guide rail, a simple and reliable mounting process is enabled.

The coupling mechanism has, for example, a coupling pin, which protrudes against the guide rail and is provided for engagement with an assigned first coupling pocket on the guide rail. The coupling pin is particularly accommodated, without play, on the first coupling pocket in the vertical direction and rests against the first coupling pocket, formed as a groove for example, inward in the transverse direction. A further coupling element may be formed by a lateral coupling tongue, which protrudes against the guide rail and is provided for engagement on an assigned second coupling pocket on the guide rail. The second coupling pocket, together with the coupling pin, can provide a play-free coupling of the cable guide unit in the transverse direction. A third coupling element is appropriately formed by a latching hook, which protrudes toward the guide rail and can detachably engage with an assigned third coupling pocket such as, for example, a latching recess, on the guide rail by means of a latching head such that the cable guide unit coupled to the guide rail is held thereon in a detachable and latching manner. During the mounting process of the sunroof frame assembly, thus sufficient fixing of the cable guide unit on the guide rail is ensured.

Appropriately, the cable guide unit contains at least one connection point, particularly a flange with a flange opening for attaching, particularly for bolting, to the guide rail. The attaching or bolting can also take place on the frame side part forming or supporting the guide rail. In doing so, the attaching of the cable guide unit to the guide rail or the frame side part takes place exclusively by means of the coupling mechanism and the connection point. Thus, further attachments and the associated mounting processes are then not necessary.

With a sunroof frame assembly of a vehicle sunroof having a bearing and drive device of an adjustable cover with a guide rail, on which the cover is mounted so as to move by means of a bearing unit which can be actuated by a drive cable and which is arranged on a frame side part of the sunroof frame assembly, a bearing and drive device having a cable guide unit according to any of claims 1 to 15 is accordingly provided according to the invention.

BRIEF DESCRIPTIONS OF THE DRAWINGS

The invention is explained in more detail in the following by means of an exemplary embodiment of a bearing and drive device according to the invention with reference to the drawings. The following is shown:

DETAILED DESCRIPTION

Figure 1:
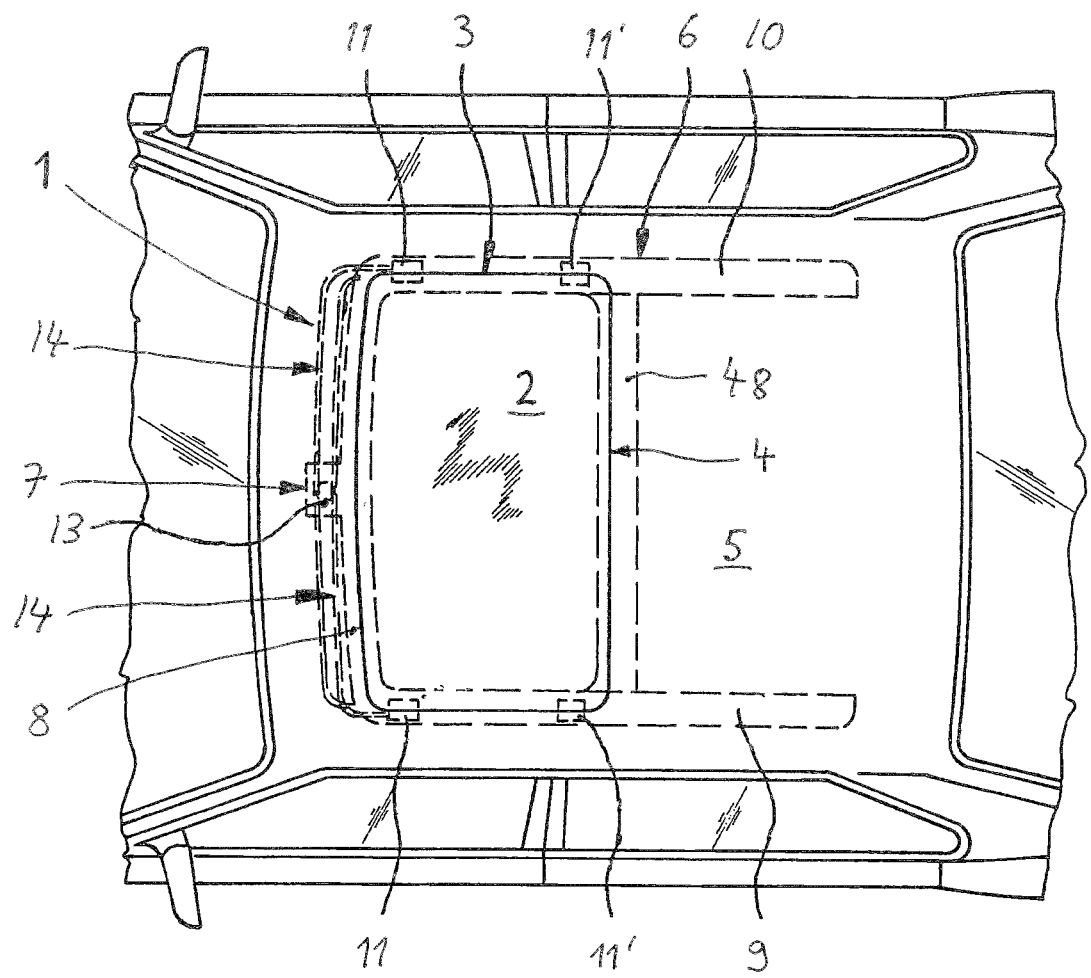
FIG. 1 shows a top view, in a schematic representation, of a vehicle roof having a sunroof and a sunroof frame assembly as well as an adjusting mechanism for a sunroof cover.

An opening vehicle roof 1 of a vehicle, such as, for example, a passenger car, has a cover 2, which can be lifted from a closed position in a roof opening 3 (FIG. 1) and adjusted into a ventilation position and can be moved from the ventilation position with a raised rear edge 4 to a roof section 5 behind the roof opening 3, in the vehicle or roof longitudinal direction, and then to an open position. Such a roof is also characterized as a spoiler roof. The rear roof section 5 can essentially be formed as a fixed roof surface or with a movable roof part. The axes and direction designations used in the description such as, for example, "front" and "rear," "upper" and "lower," "outer" and "inner," "horizontal" and "vertical," as well as "lateral," "transverse," and "longitudinal" and/or in the transverse direction and in the longitudinal direction relate to a three-dimensional X-Y-Z vehicle coordinate system.

Figure 2:
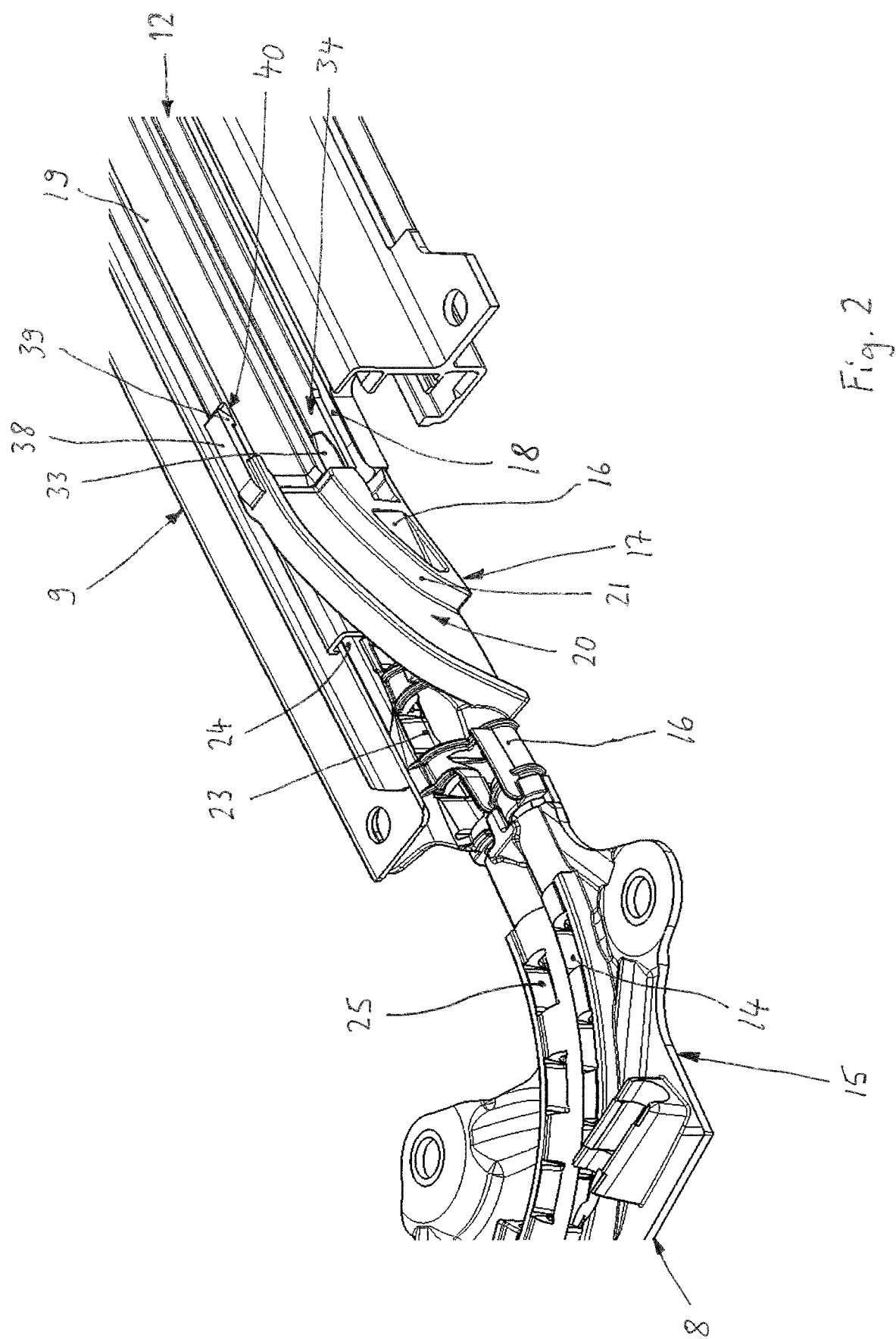
FIG. 2 shows a perspective outer view of a cable guide unit of the bearing and drive device between a frame front part and a frame side part of the sunroof frame assembly.
Figure 3:
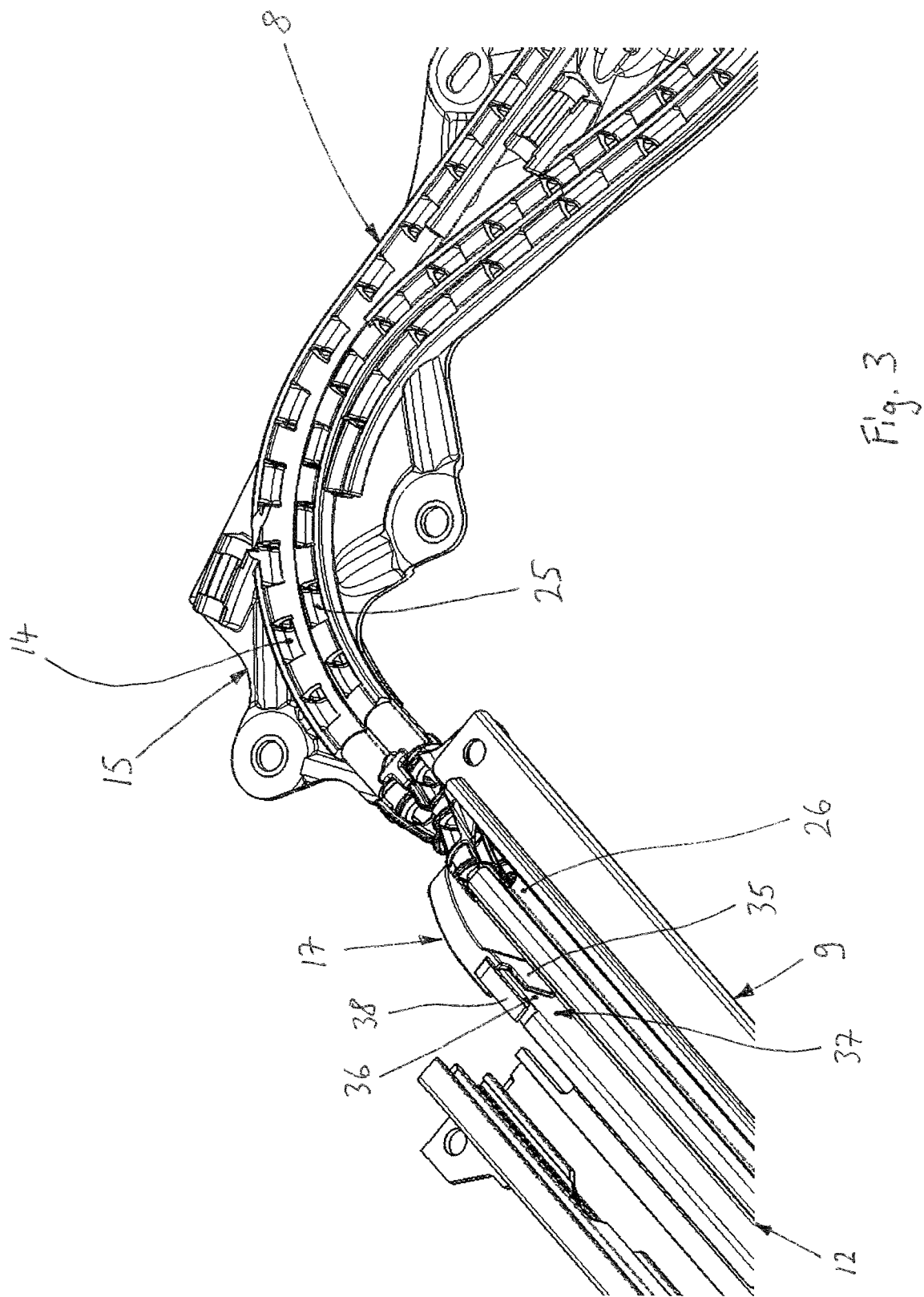
FIG. 3 shows a perspective inner view of the cable guide unit at the transition between the frame front part and the frame side part.
Figure 4:
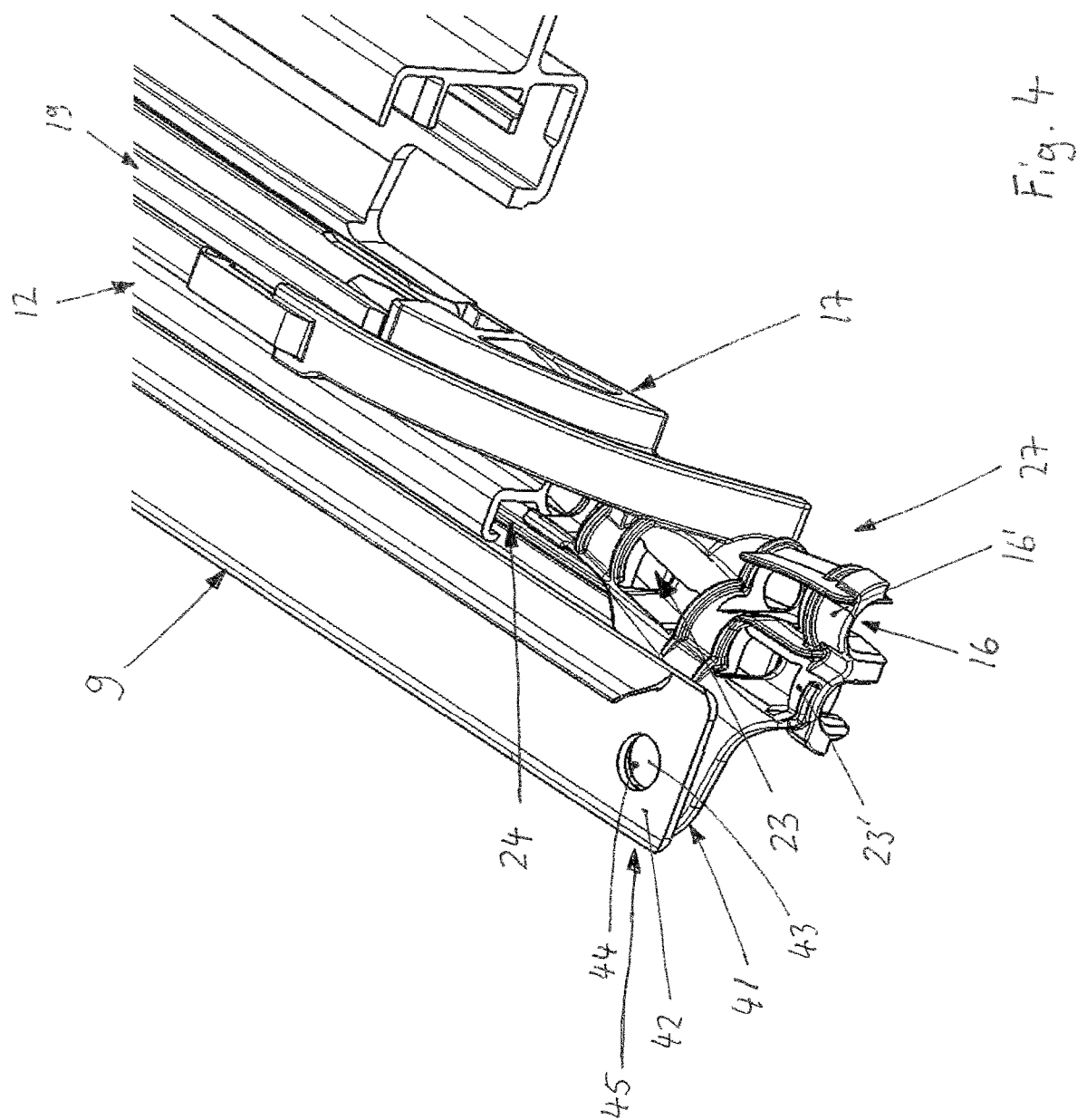
FIG. 4 shows a perspective view of the cable guide unit in its arrangement on the front end of a guide rail of the frame side part.
Figure 5:
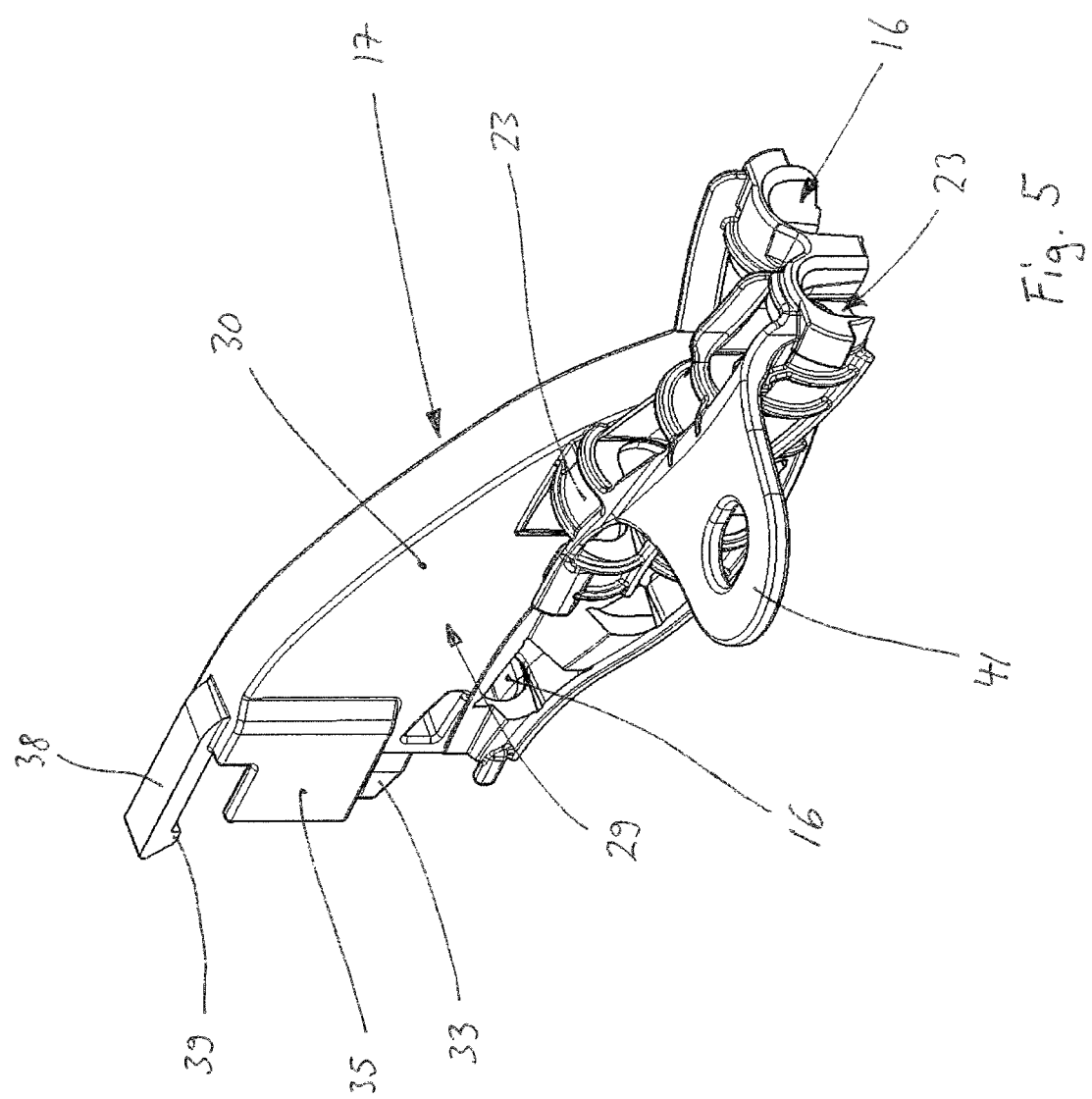
FIG. 5 shows another perspective view of the cable guide unit.
Figure 6:
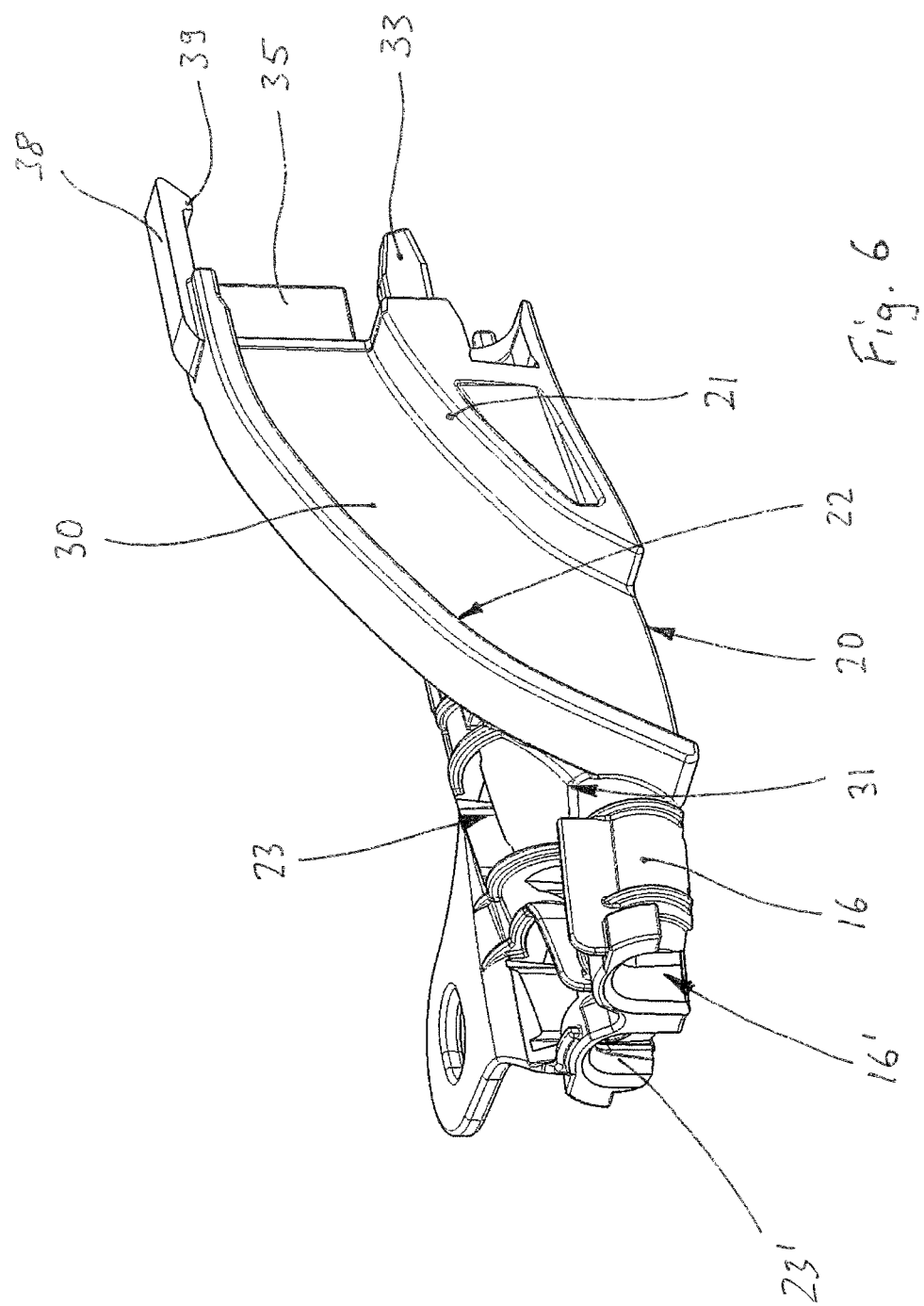
FIG. 6 shows another perspective view of the cable guide unit.
Figure 7:
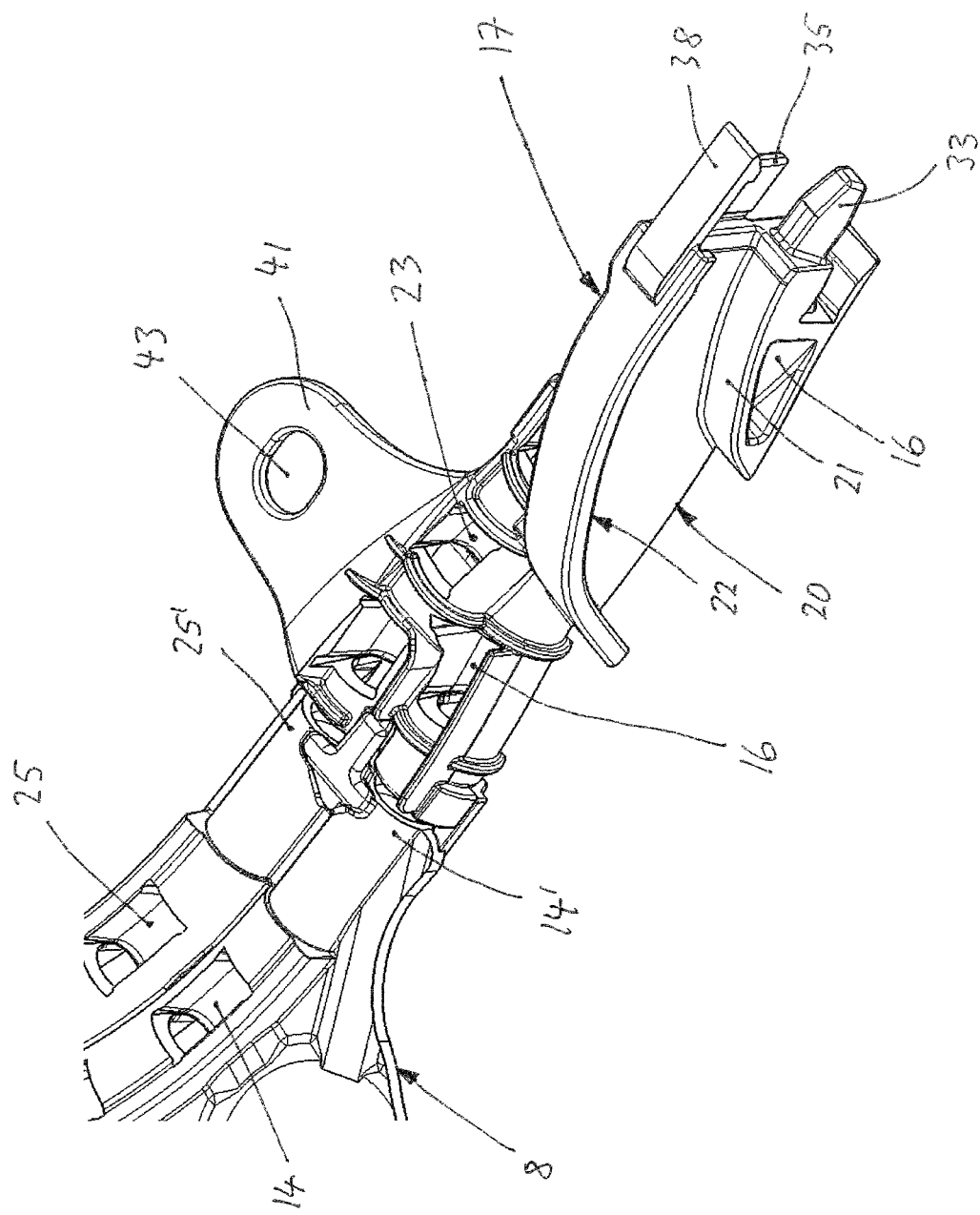
FIG. 7 shows a perspective view of the cable guide unit in its arrangement on the side end of a frame front part.
Figure 8:
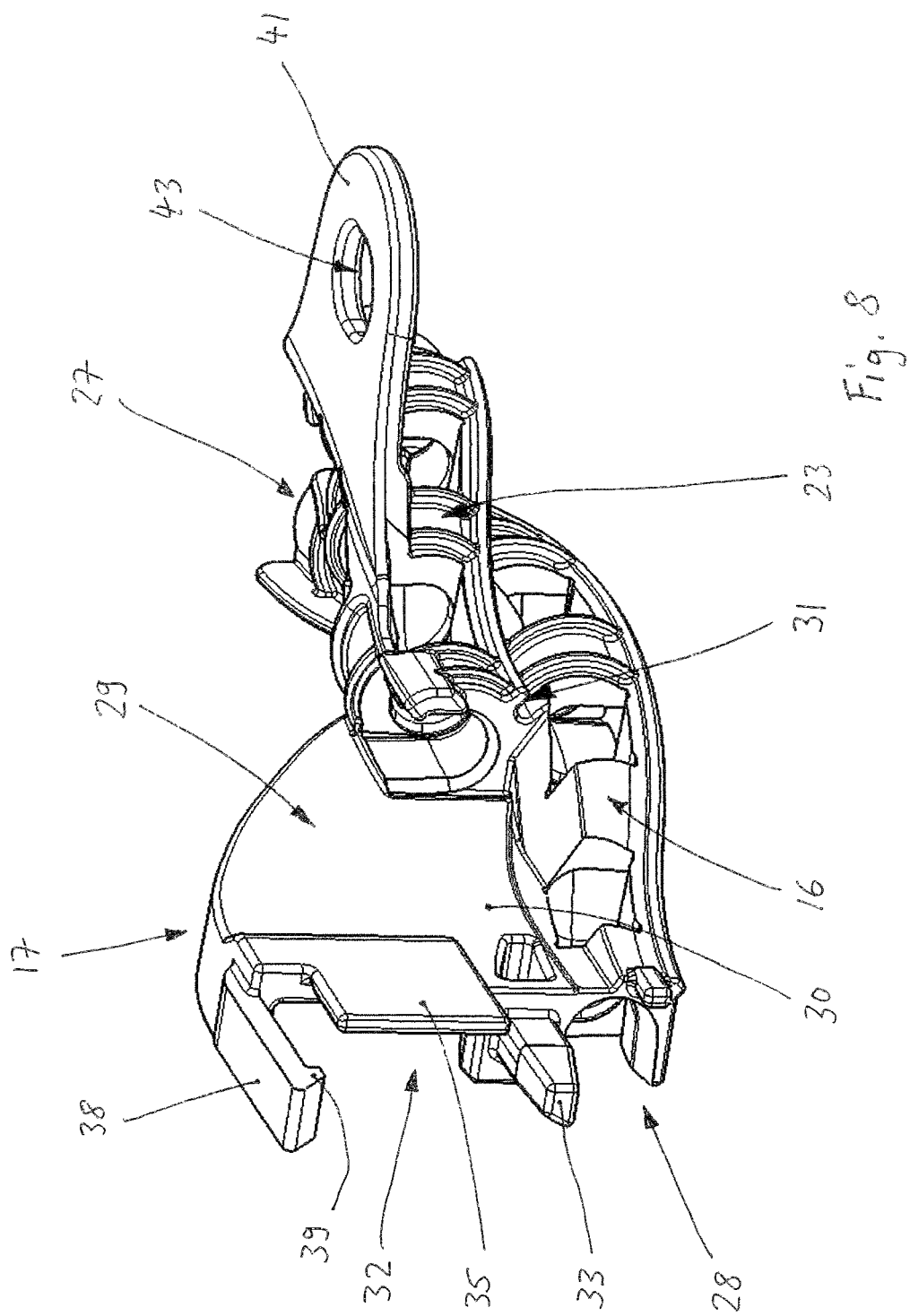
FIG. 8 shows another perspective view of the cable guide unit.
Figure 9:
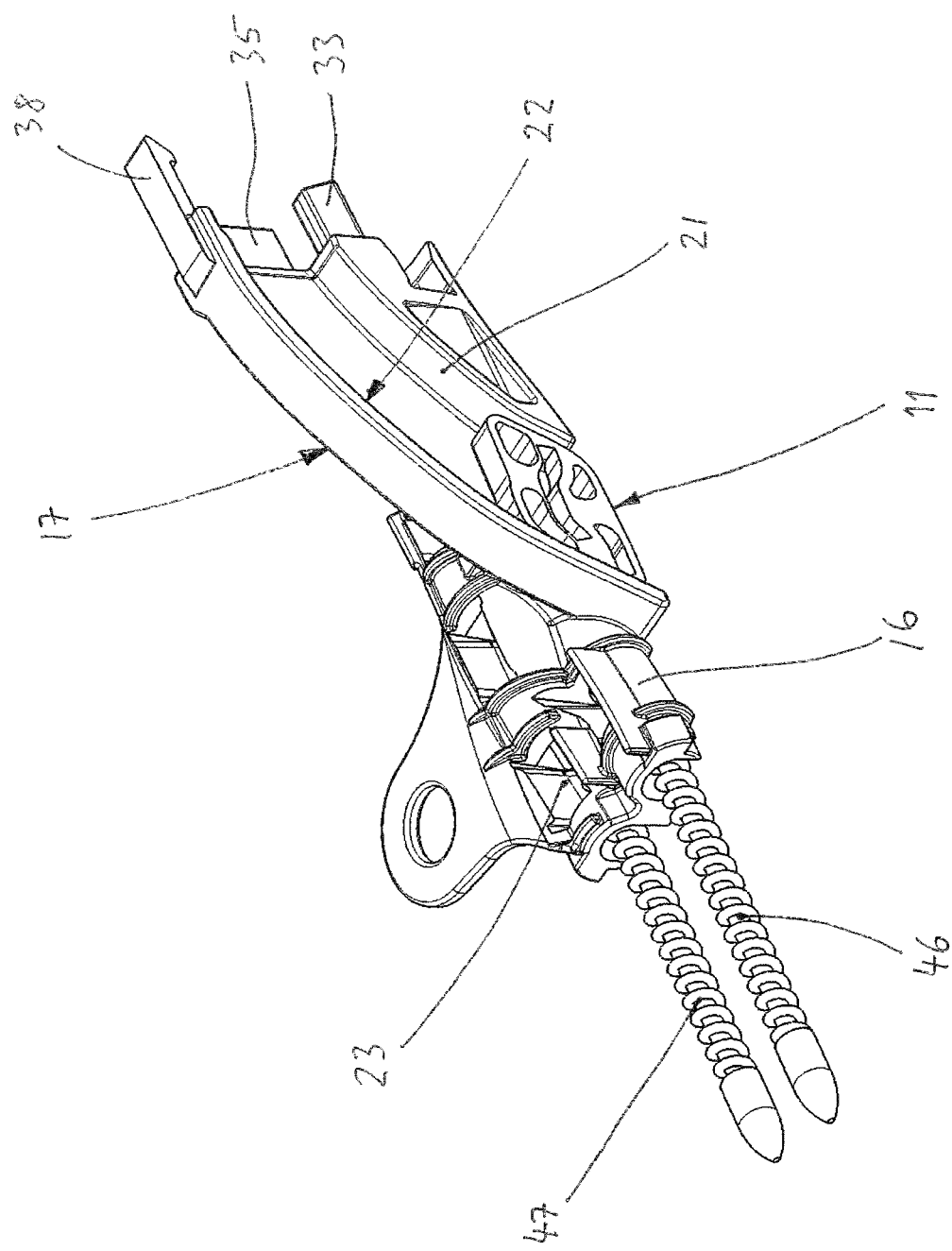
FIG. 9 shows another perspective view of the cable guide unit with two drive cables.
Figure 10:
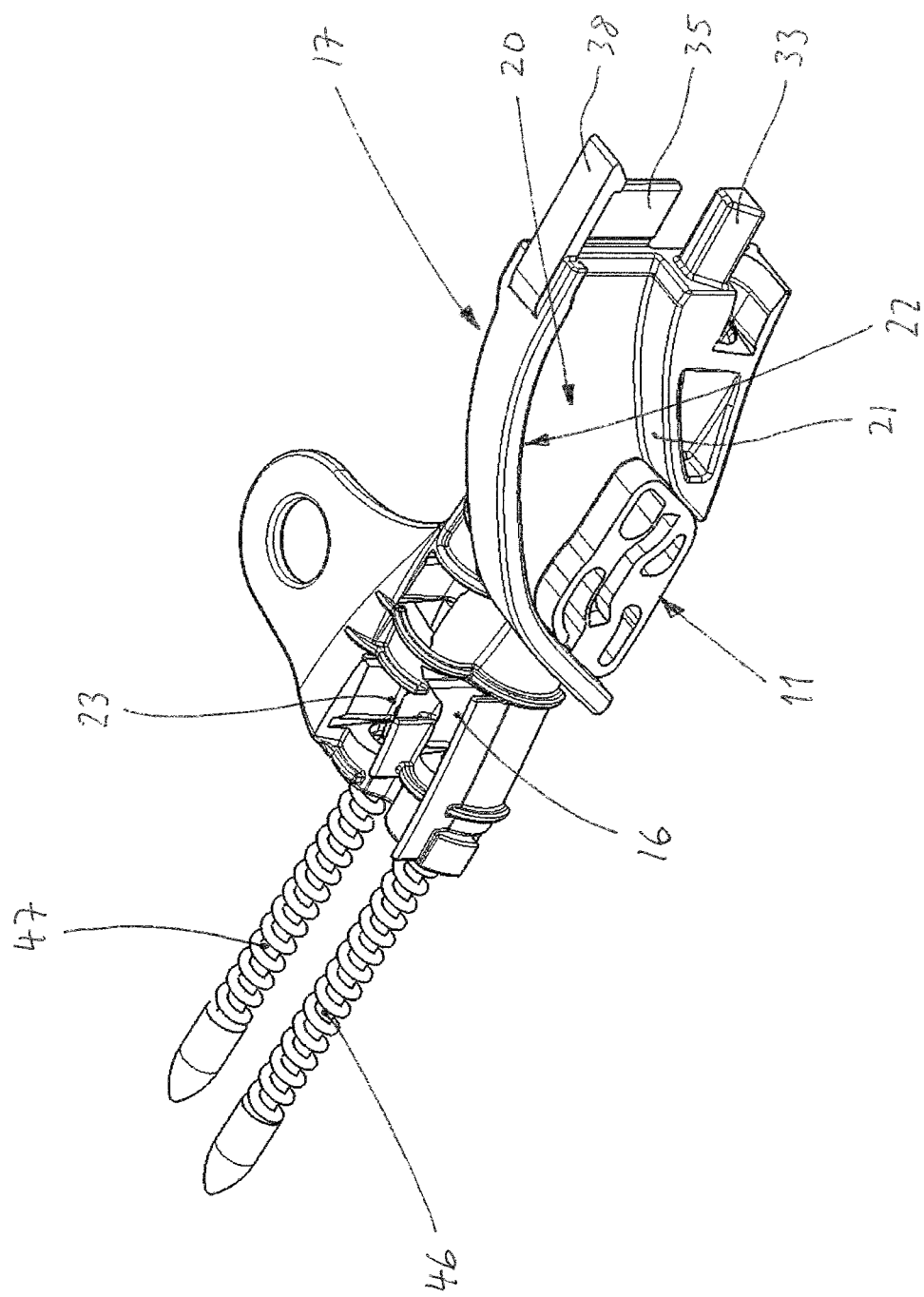
FIG. 10 shows another perspective view of the cable guide unit with two drive cables.

The vehicle roof 1 has a sunroof frame assembly 6, on which the cover 2 is mounted so as to move and can be adjusted into its different positions by means of an adjustment mechanism 7. The sunroof frame assembly 6 essentially has a transversely extending frame front part 8 and two frame side parts 9 and 10, which extend on both sides of the roof opening 3 in the roof longitudinal direction. The cover 2 is movably mounted on guide rails 12 (see FIG. 2), for example, by means of front and rear bearing or sliding units 11 and 11', respectively, shown by way of example, which are formed by the frame side parts 9 and 10 or arranged thereon. The adjustment mechanism 7 has a drive apparatus with, e.g., a drive motor 13 such as, for example, an electric gearbox motor, which is mounted on the frame front part 8 and connected, e.g., to the front slide unit 11 on the assigned guide rail 12 by means of a drive wheel or pinion with a lengthwise adjustment element such as, for example, a customary drive cable 46 (only shown in FIGS. 9 and 10) or a toothed rack, which is tensile- and pressure-resistant and bendable. Each of the two drive cables 46 is accommodated in a drive-side cable guide 14, which extends from the drive motor 13 along the frame front part 8 laterally outward to a corner area 15 of the frame front part 8.

Such a sunroof frame assembly with an adjusting and drive apparatus is essentially known from DE 40 14 487 C1. The mounting of a cover 2, which can be adjusted like a spoiler via a rear roof surface 5 extending behind the roof opening 3, is known by way of example from DE 10 2012 023 098 A1.

In the corner area 15 of the frame front part 8, the drive-side cable guide 14 extends over a curve section in the direction toward the guide rail 12 and on to an intermediate cable guide 16 of a cable guide unit 17, which is arranged on the front end of the guide rail 12 as an independent component or transition component and forms a connection between the guide rail 12 and thus the frame side part 9 and the frame front part 8. The intermediate cable guide 16 exits, on the part of the guide rail 12, into a guide channel 18 of the guide rail 12. The guide channel 18 is arranged, e.g., underneath a guide track or sliding guide track 19, which extends lengthwise of the guide rail 12 and movably supports the slide unit 11 of the cover 2.

The vehicle roof 1 with the sunroof frame assembly 6 is essentially formed symmetrically with respect to the vehicle longitudinal axis such that the description only takes place by means of the components, shown in FIGS. 2 to 8, in the front left-side corner area of the sunroof frame assembly 6.

The cable guide unit 17 is particularly formed as a plastic injection-molded part in one piece and has a guide link 20, which forms a front side section of the sliding guide track 19 and has a rising curve in the longitudinal direction. The slide unit 11 is guided between a lower guide link 21 and an upper sliding track 22 of the guide link 20 and is located at the front lower end of the guide link 20 when the cover 2 is closed and is raised to the level of the sliding guide track 19 under rearward displacement during tilting and opening of the cover 2 and transferred to the sliding guide track 19.

The cable guide unit 17 furthermore has an additional second intermediate cable guide 23, which is provided for an assigned drive cable 47 (see FIGS. 9 and 10) for actuating a shade apparatus such as, for example, a roller blind (not shown), which is movably mounted on a blind guide 24 on the frame side part 9 or the guide rail 12. The additional or second intermediate cable guide 23 forms the connection and the transition between a blind cable guide 25 on the frame front part 8 and a blind cable guide channel 26 (see FIG. 3) on the guide rail 12 and/or the frame side part 9. In the corner area 15 of the frame front part 8, the blind cable guide 25 extends more or less in a horizontal plane with the cable guide 14 next to it and inward thereto in the curve section. The frame front part 8 is appropriately a plastic injection-molded part, in which each cable guide 14 and each blind cable guide 25, as well as brackets for the drive motor 13, and a blind drive are injection-molded.

The two intermediate cable guides 16 and 23 are arranged directly next to one another on a front side 27 of the cable guide unit 17 facing the frame front part 8 and assigned to the two end sections 14' and 25' of the cable guide 14 and the blind cable guide 25, respectively and have front-side connection sections 16' or 23', respectively, which are formed, e.g., as a type of half shell and which rest upon the end sections 14' and 25' of the cable guide 14 and the blind cable guide 25, respectively and hereby enable a precise mutual coaxial arrangement.

The additional intermediate cable guide 23 of the blind drive cable 47 extends slightly upward to a back side 28, facing toward the guide rail 12, of the cable guide unit 17 and approaches the outer side 29 of a wall 30 of the guide link 20, which is facing away from the two sliding tracks 21 and 22 and is formed as a single piece with this wall 30 at least over one section, whereby a very compact design is achieved in the transverse direction or Y direction.

The intermediate cable guide 16 of the drive cable 46 extends from the front side 27 of the cable guide unit 17 proceeding inward under the additional intermediate cable guide 23 and directly on the outer sides 29 of the wall 30 of the guide link 20 along and toward the rear side 28 under the wall 30 of the raised end of the guide link 20. Thus, the two intermediate cable guide 16 and 23 intersect in a compact arrangement and may particularly have a common wall 31. The two intermediate cable guides 16 and 23 may end, in the longitudinal direction, at the same height in the X direction, or the upper intermediate cable guide 23 ends some distance before the lower intermediate cable guide 16 and is thus set back with respect to it. The front-side connections of the guide channel 18 of the guide rail 12 and of the sun blind cable guide channel 26 are formed and positioned accordingly. The intermediate cable guide 16 of the drive cable 46 as well as the additional intermediate cable guide 23 of the blind drive cable 47 are formed such that they surround the respective cable 46 or 47 along its axial extension with alternating opposing wall sections, wherein the wall sections surround the cables particularly alternating on the upper side and the lower side with respect to the installation position of the cable guide unit 17. Thus, the cable guide unit 17 can be simply produced as an injection-molded part by means of a simply designed injection-molded tool, particularly in the area of these intermediate cable guides 16 and 23.

The cable guide unit 17 can be coupled and attached to the guide rail 12 by means of a coupling mechanism 32. The coupling mechanism 32 has multiple coupling elements such as, e.g., a coupling pin 33, which protrudes from the back side 28 of the cable guide unit 17, in the area underneath the lower sliding track 21, against the guide rail 12 and is provided for engagement with an assigned first coupling pocket 34 on the guide rail 12. The coupling pin 33 is accommodated, without play, on the first coupling pocket 34 in the vertical direction and rests against the first coupling pocket 34, formed as a groove for example, inward in the transverse direction.

A further coupling element is formed by a lateral coupling tongue 35, which protrudes against the guide rail 12 as an extension of the wall 30 of the guide link 20 and is provided for engagement on an assigned second coupling pocket 36 on the guide rail 12. The second coupling pocket 36 is, e.g., a back wall 37 of the sliding guide track 19 of the guide rail 12, on which the coupling tongue 35 rests, and thus provides, together with the coupling pin 33, a play-free coupling of the cable guide unit 17 in the transverse direction.

A third coupling element is formed by a latching hook 38, which protrudes from the rear end of the upper sliding track 22 of the guide link 20 toward the guide rail 12 and can detachably engage, with its latching head 39, with an assigned third coupling pocket 40 such as, for example, a latching recess, on the guide rail 12 such that the cable guide unit 17 coupled to the guide rail 12 is held thereon in a detachable and latching manner. During the mounting process of the sunroof frame assembly 6, thus sufficient fixing of the cable guide unit 17 on the guide rail 12 is ensured.

The cable guide unit 17 has a flange 41, which is molded, e.g., on the additional intermediate cable guide 23 and extends horizontally inward with respect to the guide rail 12 and the frame side part 9 such that it, fits closely, e.g., from below, on a front horizontal rail section 42 of the guide rail 12 when the cable guide unit 17 is coupled thereto. A flange opening 43 of the flange 41 is then positioned under an opening 44 in the rail section 42 such that a connection can be implemented by means of a connection element, such as, e.g., a bolt or the like, which engages by means of the two openings 43 and 44. This connection at the connection point 45 formed by the described elements can simultaneously form an attachment of the guide rail 12 and/or of the frame side part 9 on the vehicle roof or on a roof frame assigned to the vehicle roof.

The drive apparatus for adjusting the cover 2 as well as the blind device may also be arranged on a rear frame lateral part or frame rear part 48 (see FIG. 1) of the sunroof frame assembly 6. The cable guide unit 17 then forms the transition, to the rear as relates to the guide rail 12, between the rear end of the guide rail 12 and the side area of the frame rear part 48. With such a cable guide unit 17, the designations of the front side 27 and back side 28 are then reversed.

Essentially, the cable guide unit 17 is suitable for any installation position of a guide rail 12 and a sunroof frame assembly 6, particularly on a vehicle roof.

The individual features disclosed in the description and by means of the exemplary embodiment may be combined with the subject matter of the invention in its general form in any technically suitable arrangements and designs.

LIST OF REFERENCE NUMERALS

| | |
|---|---|
| 1 | Vehicle roof |
| 2 | Cover |
| 3 | Roof opening |
| 4 | Rear edge |
| 5 | Roof section |
| 6 | Sunroof frame assembly |
| 7 | Adjustment mechanism |
| 8 | Frame front part |
| 9 | Frame side part |
| 10 | Frame side part |
| 11 | Front slide unit |
| 11' | Rear slide unit |
| 12 | Guide rail |
| 13 | Drive motor |
| 14 | Cable guide |
| 14' | End section |
| 15 | Corner area |
| 16 | Intermediate cable guide |
| 16' | Connection section |
| 17 | Cable guide unit |
| 18 | Guide channel |
| 19 | Sliding guide track |
| 20 | Guide link |
| 21 | Lower sliding track |
| 22 | Upper sliding track |
| 23 | Additional intermediate cable guide |
| 23' | Connection section |
| 24 | Blind guide |
| 25 | Blind cable guide |
| 25' | End section |
| 26 | Blind cable guide channel |
| 27 | Front side |
| 28 | Back side |
| 29 | Outer side |
| 30 | Wall |
| 31 | Wall |
| 32 | Coupling mechanism |
| 33 | Coupling pin |
| 34 | First coupling pocket |
| 35 | Coupling tongue |
| 36 | Second coupling pocket |
| 37 | Rear wall |
| 38 | Latching hook |
| 39 | Latching head |
| 40 | Third coupling pocket |
| 41 | Flange |
| 42 | Rail section |
| 43 | Flange opening |
| 44 | Opening |
| 45 | Connection point |
| 46 | Drive cable |
| 47 | Blind drive cable |
| 48 | Frame rear part |

The invention claimed is:

1. A bearing and drive device of an adjustable cover of a vehicle roof comprising:
a guide rail, on which the cover is movably mounted by means of a bearing unit which can be actuated by a drive cable,
wherein,
a cable guide unit is provided, coupled with the guide rail on the end or front side and
which has at least one intermediate cable guide for the drive cable and
a guide link for the bearing unit.

2. The bearing and drive device according to claim 1, wherein the guide link of the cable guide unit forms an end section of an assigned guide track of the guide rail, which movably supports the bearing unit.

3. The bearing and drive device according to claim 1, wherein the cable guide unit forms a transition component between at least one drive-side cable guide and the guide rail.

4. The bearing and drive device according to claim 1, wherein the at least one intermediate cable guide of the cable guide unit and the guide link have a common wall.

5. The bearing and drive device according to claim 1, wherein the cable guide unit has two intermediate cable guides, which are integrated with one another and have a common wall.

6. The bearing and drive device according to claim 1, wherein two intermediate cable guides extend over one another in sections.

7. The bearing and drive device according to claim 1, wherein intermediate cable guides are formed such that they guide and/or surround the respective drive cable along its longitudinal extension alternating on opposite sides.

8. The bearing and drive device according to claim 1, wherein the one intermediate cable guide is arranged on a back side of the cable guide unit, facing toward the guide rail.

9. The bearing and drive device according to claim 1, wherein the cable guide unit has a coupling mechanism with at least one coupling element for precise coupling to the guide rail.

10. The bearing and drive device according to claim 1, wherein a coupling mechanism has a coupling element in the form of a coupling pin, which protrudes against the guide rail and is provided for engagement with an assigned first coupling pocket on the guide rail and is accommodated on the first coupling pocket in the vertical direction without play.

11. The bearing and drive device according to claim 1, wherein a coupling mechanism has a coupling element in the form of a lateral coupling tongue, which protrudes against the guide rail and is provided for engagement with a second coupling pocket on the guide rail, wherein the second coupling pocket together with a coupling pin provides a play-free coupling of the cable guide unit in the transverse direction.

12. The bearing and drive device according to claim 1, wherein a coupling mechanism has a coupling element in the form of a latching hook, which protrudes toward the guide rail and detachably engages, with a latching head, with an assigned third coupling pocket on the guide rail.

13. The bearing and drive device according to claim 1, wherein the cable guide unit has at least one connection point, a flange with a flange opening, for attaching, to the guide rail.

14. The bearing and drive device according to claim 13, wherein the attaching of the cable guide unit to the guide rail takes place exclusively by the coupling mechanism and the connection point.

15. The bearing and drive device according to claim 1, wherein the cable guide unit forms a transition component between at least one drive-side cable guide and the guide rail such that a laterally extending frame front part of a sunroof frame assembly, which supports a drive apparatus and drive-side cable guides, is connected to frame side parts of the sunroof frame assembly exclusively via this cable guide unit.

16. A sunroof frame assembly of a vehicle sunroof comprising: a bearing and drive device of an adjustable cover, wherein a guide rail, on which the cover is mounted so as to move by a bearing unit actuated by a drive cable, is arranged on a frame side part of the sunroof frame assembly, having a bearing and drive device according to claim 1.

\* \* \* \* \*